United States Patent Office.

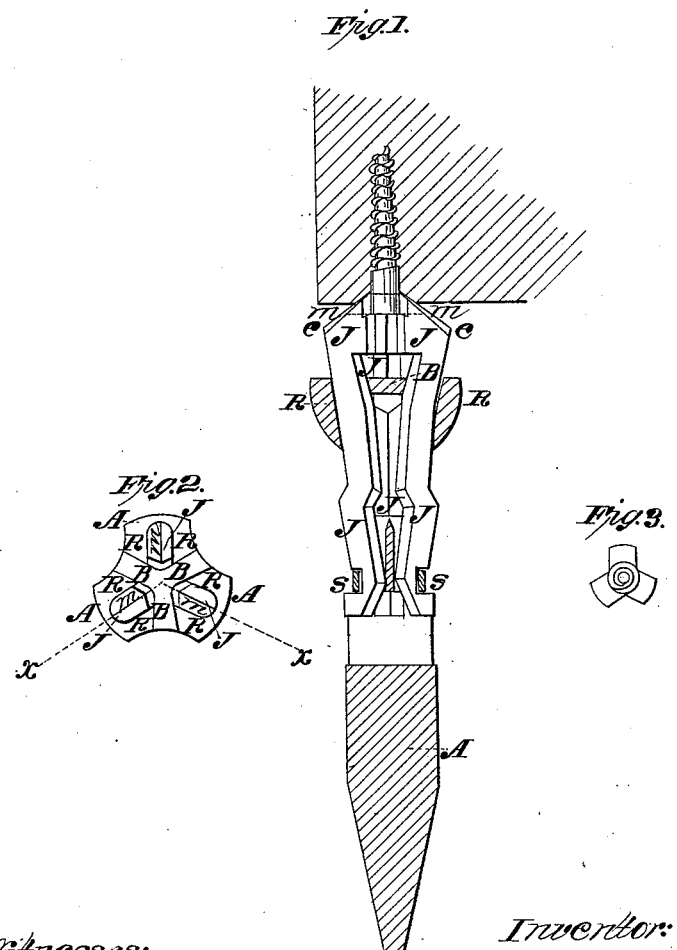

PETER N. JACOBUS, OF FLATBROOKVILLE, NEW JERSEY.

Letters Patent No. 81,171, dated August 18, 1868.

---

IMPROVEMENT IN SCREW-DRIVER AND COUNTERSINK.

---

*The Schedule referred to in these Letters Patent and making part of the same.*

---

TO ALL WHOM IT MAY CONCERN:

Be it known that I, PETER N. JACOBUS, of Flatbrookville, in the county of Sussex, and State of New Jersey, have invented a new and improved Screw-Driver and Countersink; and I do hereby declare that the following is a full, clear, and exact description of the construction and operation of the same, reference being had to the accompanying drawings, making a part of this specification, in which—

Figure 1 is a longitudinal vertical section through line $x\ x$ of fig. 2.

Figure 2 is an end view.

Figure 3 is an end view of the screw.

The object of this invention is to construct a screw-driver in such a manner that it will grasp the screw by the head, and hold it firmly while inserting it into the wood or removing it therefrom, and, while inserting the screw, shall ream away the wood around it, so as to form a countersink for its head.

To accomplish this object, I insert several (preferably three) griping-jaws in the end of the stock or tool, in suitable sockets provided for the purpose, constructing and arranging the jaws in the end or head of the tool in such a manner that they are capable of sliding longitudinally, and as they are slid out, their ends will diverge and drop the screw, while, as they are slid in, they will converge, and grasp its head firmly. The ends of the jaws which thus operate are bevelled off, and provided with cutters, which ream away the wood under the head of the screw as the head approaches the surface of the wood, preparing a countersink, in which the screw, when fully inserted, lies flush with the surface of the wood.

In the drawings—

A represents that part of the tool which holds the griping-jaws, the latter being shown at J J J.

The jaws slide longitudinally in the part A, being held in place by a fixed ring, R, on the extreme end thereof, and by a sliding ring, S, which encircles the part A, and the inner ends of the jaws J J J.

The ring R may be, as seen in the drawings, simply a bulge on the end of the part A, provided with holes to receive and hold each jaw.

The jaws may be further held in position, and guided in their motions, by a piece of metal, B, having three arms, and extending across the end of the part A between the jaws, as seen in fig. 2.

The jaws are so shaped that as thus constructed and attached to the part A, their outer or griping ends will approach each other when the jaws are slid inward in their sockets, and will firmly grasp and hold any object that may happen to be between them, releasing it, of course, when slid outward again.

As thus constructed, they are intended to grasp and hold the head of the screw while inserting the latter into or removing it from the wood.

The head of the screw, as seen in fig. 3, is notched on three sides, (or more, if intended to be used with a screw-driver having more than three jaws,) and the inner side of each jaw is bevelled off from the centre, so that as the jaws come together they will nicely fit into the notches of the screw-head, and thus hold the screw much more firmly.

The ends of the jaws are bevelled off from their inner edge, as seen in fig. 1, and are provided with a sharp cutting-edge or shoulder, $m$, extending from the point at their extremity down to the corner $e$, and serving, as the screw-driver comes in contact with the wood, to ream away the latter around the screw just enough to countersink the head of the screw.

In working in soft wood, the cutting-shoulders may not be necessary, but the jaws may be tapering and smooth.

With this instrument, the screw can be more easily and readily inserted than with such as have been heretofore employed for the purpose.

It is not necessary to bore a hole to receive the screw, but the latter can be grasped and forced into the wood without difficulty. Neither is it necessary to prepare a countersink before inserting the screw, as the instrument performs that office without any additional effort, and without any appreciable outlay of additional force on the part of the workman.

Having thus described my invention, what I claim as new, and desire to secure by Letters Patent, is—

1. A screw-driver, provided with sliding jaws, so operating that as they are slid inward they converge, and grasp the head of the screw firmly, and as they are slid out again, they diverge, and release it.

2. The combination of the part A, having the fixed ring R, the sliding ring S, the movable jaws J J J, and the metallic piece B, substantially as described.

To the above specification of my improvement, I have signed my hand, this 5th day of June, 1868.

PETER N. JACOBUS.

Witnesses:
   CHAS. A. PETTIT,
   SOLON C. KEMON.